H. M. SMYTH.
VALVE GEAR.
APPLICATION FILED APR. 22, 1919.

1,370,925.

Patented Mar. 8, 1921.

Henry M. Smyth, Inventor

By his Attorney

Thomas Howe

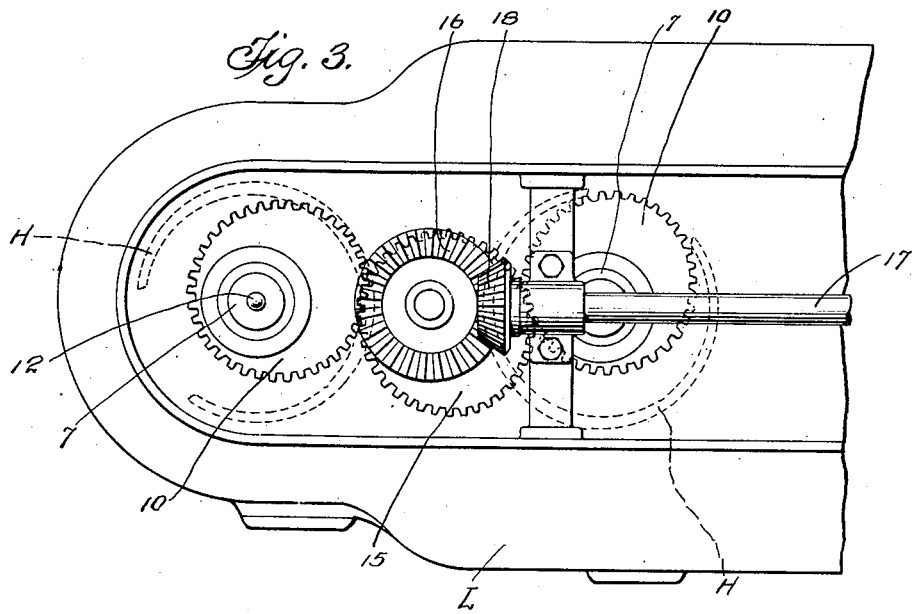
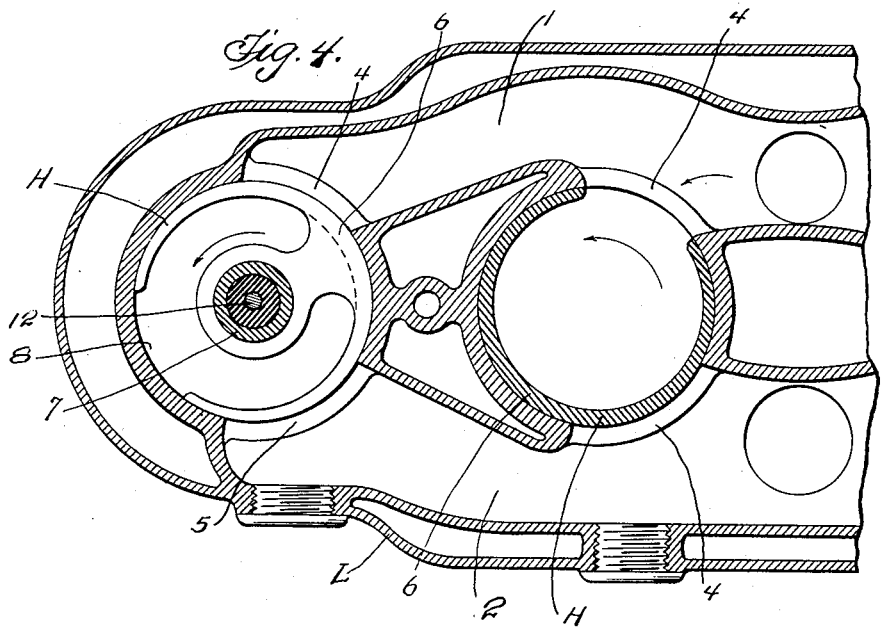

H. M. SMYTH.
VALVE GEAR.
APPLICATION FILED APR. 22, 1919.
1,370,925.
Patented Mar. 8, 1921.
3 SHEETS—SHEET 3.
Fig. 5.
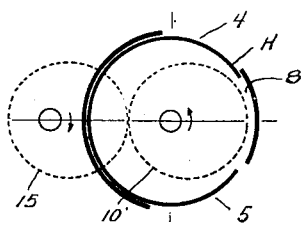
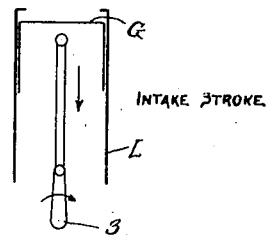
INTAKE STROKE
Fig. 6.
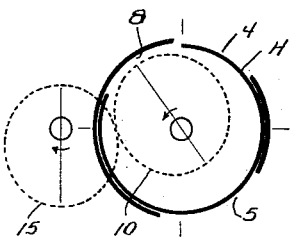
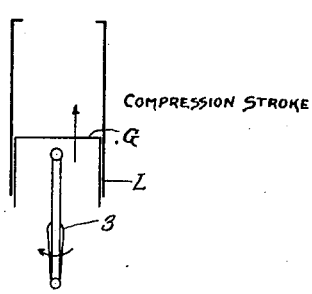
COMPRESSION STROKE
Fig. 7.
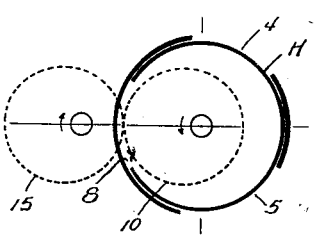
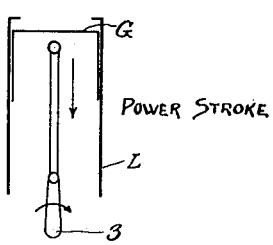
POWER STROKE
Fig. 8.
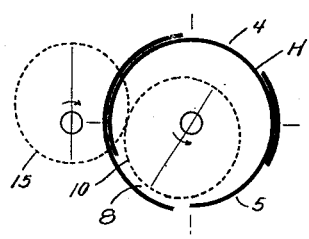
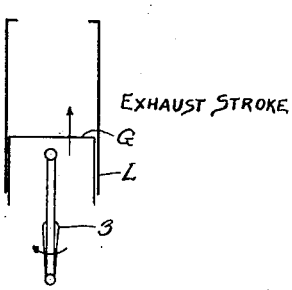
EXHAUST STROKE
Henry M. Smyth Inventor
By his Attorney
Thomas Howe

UNITED STATES PATENT OFFICE.

HENRY M. SMYTH, OF NEW YORK, N. Y.

VALVE-GEAR.

1,370,925.

Specification of Letters Patent.

Patented Mar. 8, 1921.

Application filed April 22, 1919. Serial No. 291,867.

*To all whom it may concern:*

Be it known that I, HENRY M. SMYTH, a citizen of the United States, residing at city, county, and State of New York, have invented new and useful Improvements in Valve-Gears, of which the following is a specification.

This invention relates to a valve mechanism for internal combustion engines, and particularly to a rotary valve mechanism.

An object of the invention is to provide a valve mechanism in which adequate openings are provided for relieving the engine of much of the back pressure ordinarily found present effecting the movements of the pistons.

A further object is to provide a valve mechanism embodying unusually large intake and exhaust ports, together with means for controlling the opening and closing thereof in accordance with the requirements of the moving pistons.

A further object is to accomplish the above results in a device in which the valves are of the rotary type.

A further and more detailed object is to provide a valve mechanism including rotary valves and a simple and practical mechanism for rotating the valves at non-uniform speed.

A further object is to provide a valve mechanism including non-uniformly rotating valves so related that the various movements thereof are balanced against each other in such manner that the power exerted for producing the operations is at all times uniform.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:

Fig. 3 is a top plan view, somewhat enlarged, of the valve operating mechanism appearing at the left hand side of Fig. 2.

Fig. 4 is a horizontal sectional view through a portion of the engine shown in Figs. 1 and 2, being somewhat enlarged, and the section being taken substantially upon the plane of line IV—IV of Figs. 1 and 2 for showing the relationship existing between the two adjacent valves.

Fig. 5 is a diagrammatic view illustrating the position of the essential elements when the piston is at the beginning of its intake stroke.

Fig. 6 is a diagrammatic view illustrating the position of the essential elements when the piston is at the beginning of its compression stroke.

Fig. 7 is a diagrammatic view illustrating the position of the essential elements when the piston is at the beginning of its power stroke, and Fig. 8 is a diagrammatic view illustrating the position of the essential elements when the piston is at the beginning of its exhaust stroke.

Figure 1:
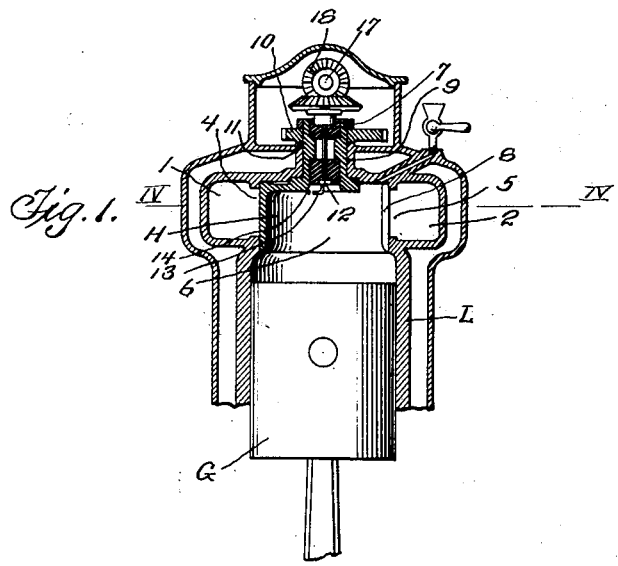
Figure 1 is a transverse sectional view taken through the cylinder of an engine fitted with a valve mechanism constructed in accordance with this invention.
Figure 2:
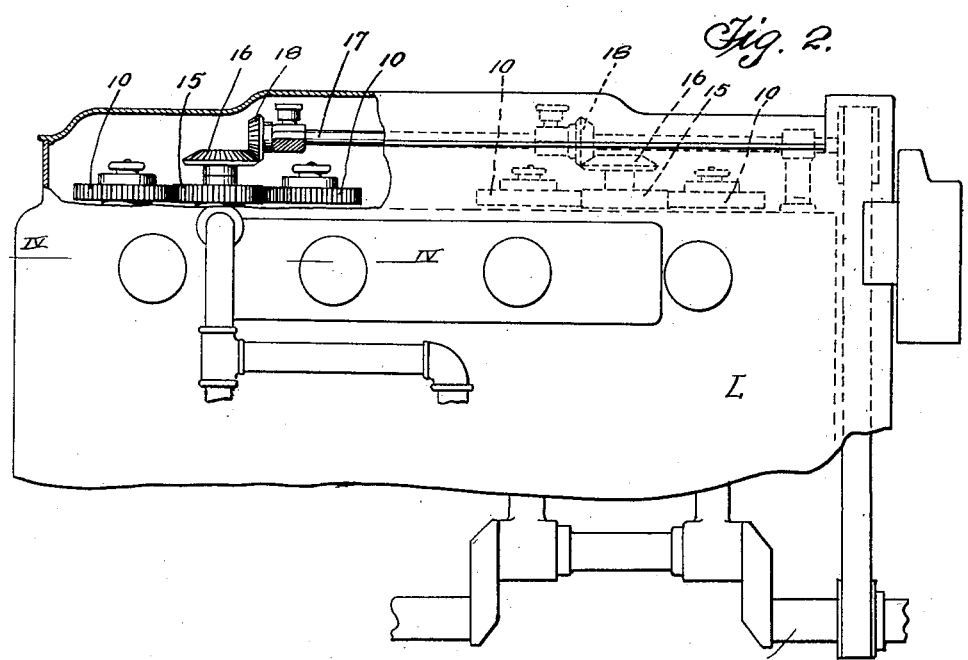
Fig. 2 is a side elevational view of the engine shown in Fig. 1, a portion thereof being broken away to show the valve operating means therein.

Referring to the drawings for describing in detail the structure which is illustrated therein, the reference character L indicates the body of an engine providing the intake manifold 1 and exhaust manifold 2. These manifolds may be of any desired type, either formed integrally with the engine casting, as illustrated, or otherwise, as preferred. The cylinders are preferably arranged in pairs and any desired number of pairs may be present. Each cylinder is provided with a piston, as G, movable longitudinally therein and being connected to rotate a crank shaft 3 in the usual way. Each cylinder also is provided with an intake port 4 and an exhaust port 5 communicating with the manifolds 1 and 2 respectively.

A single rotary valve H is provided for each cylinder. All of the valves H are of identical construction and each consists of a cylindrical main or body part 6 and a stem part 7. The body parts 6 are fitted into suitable cylindrical pockets formed concentrically in the upper ends of the respective cylinders, said pockets having the intake and exhaust ports 4 and 5 formed through the walls thereof. A single suitable opening 8 is formed in the body part 6 adapted, as the body rotates, to register with one of said ports and then the other. The lower end of the body is open so that free communication is afforded through the opening 8 between the engine cylinder and one or the other of the ports 4 and 5.

The stem part 7 projects upwardly from the body through an appropriate bearing 9 formed concentrically with the cylinder. A gear 10 is fixed to the stem 7 beyond the bearing 9 and serves as a means by which to rotate the valve. This gear rests directly upon the upper end portion, as 11, of the bearing 9 and serves to support the weight of the valve and coöperates with the bearing to maintain the valve in its proper functioning position.

The stem thus arranged is admirably suited to serve as a spark plug and for this purpose it is preferably made hollow and carries an insulated conductor 12 centrally therethrough fitted with spark points or the like, as 13, at its inner end disposed to coöperate with other spark points 14 fixed to the body 6 at the inner end of the stem. It is to be noted, in this connection, that the spark points 13 and 14 thus arranged are directly adjacent to the intake port so that their efficient operation is practically assured.

The gears 10 of each pair of cylinders are connected together by an intermediate gear 15. The gears 15 are fixed to beveled gears 16 and all of the beveled gears 16 are driven from a common shaft 17 carrying beveled pinions 18 engaging the gears 16. The shaft 17 may be driven in any appropriate manner from the crank shaft of the engine. Its speed of rotation is uniform and the gears are so proportioned to each other that one complete revolution is given to each of the gears 10 to each two complete revolutions of the engine crank shaft.

From the description of parts as thus far given it will be apparent that the movements of the crank shaft produce simultaneous rotation of all of the valves H so that all of said valves move to open and close the intake and exhaust ports of their respective cylinders at predetermined times according to the relation of the valve openings 8 with the respective gears 10.

In order now to provide for the use of unusually large intake and exhaust ports, as above suggested, this invention contemplates means for causing the valves H to rotate at a non-uniform speed. One means of accomplishing this result includes making of all the gears 10 and 15 eccentric and elliptical and of relating them to each other so that the uniform speed of rotation imparted by the shaft 17 to the gears 15 will cause the gears 10 to rotate at constantly varying speeds for accomplishing the results substantially as indicated in the diagrammatic views Figs. 5, 6, 7 and 8, as follows:

In the diagrammatic view Fig. 5, wherein the parts are shown with the piston at the beginning of the intake stroke, it will be seen that the gear 15 is operating through its longest radius upon the shortest radius of the gear 10 and is thus, at this time, producing a relatively very rapid speed of rotation of the gear 10. As the piston moves downwardly the intake port 4, therefore, becomes widely opened by the initial downward movements of the piston. As the piston reaches its full down position, as shown in Fig. 6, a relatively shorter radius of the gear 15 gradually comes to operate upon a relatively longer radius of the gear 10 thus decreasing the speed of rotation of the gear 10 as the intake port is closing. This rapid opening and slow closing of the intake port is very essential in that it permits the flow of fuel into the cylinder to be in full response to the need caused by the downwardly moving piston.

The intake port is preferably of such width as to remain open for a slight period after the piston has reached its lowermost point, thus to further permit the full inflow of fuel.

As the piston now moves upwardly on its compression stroke, toward the position shown in Fig. 7, the shortest radius of the gear 15 is gradually brought to operate upon the longest radius of the gear 10 thus causing the speed of rotation of the gear 10 during this period to be greatly reduced. Of course, neither the intake or exhaust ports are uncovered in this period.

As the piston moves downwardly on its working stroke, toward the position seen in Fig. 8, an increased radius of the gear 15 is again gradually brought to bear upon a decreasing radius of the gear 10, thus gradually accelerating the movements of the gear 10 so that the operation of opening the exhaust port 5 begins at a time when the speed of the gear 10 is rapidly increasing. The exhaust port is preferably so disposed as to open slightly in advance of the full down position of the piston and the ratio between the gears 10 and 15 at this time is such that the exhaust port becomes fully open by only the initial upward movements of the piston, the opening having been accomplished while the piston is at nearly a standstill in its lower position. The exhaust port stands fully open for the major portion of the upward stroke of the piston, and its closing is accomplished quickly, due to the increasing relative speed of the gear 10 as the piston reaches its uppermost position; that is, the position shown in Fig. 5.

This quick movement of the valve in closing the exhaust has the advantage that only a very small movement of the crank is necessary to produce a comparatively large movement of the valve so that the exhaust port may remain open until the piston reaches its uppermost position, and the valve still be closed in time, the valve moving over a wide opening of port in an extremely short time.

This cycle of operations is repeated in subsequent rotations of the gear 15.

The speed of rotation of the gear 10 and consequently of the valve H, is constantly changing. The changes are gradual but nevertheless pronounced. It will be observed by inspection of the diagrammatic views Figs. 5 to 8 that a one-quarter rotation of the gear 15, for instance from the position shown in Fig. 5 to the position shown in Fig. 6, produces considerably more than a one-quarter rotation of the gear 10. A further one-quarter rotation of the gear 15; that is, from the position shown in Fig. 6 to the position shown in Fig. 7, produces considerably less than a one-quarter rotation of the gear 10. A further one-quarter rotation of the gear 15; that is, from the position shown in Fig. 7 to the position shown in Fig. 8 also produces considerably less than a one-quarter rotation of the gear 10, while a final one-quarter rotation of the gear 15; that is, from the position shown in Fig. 8 to the position shown in Fig. 5, produces considerably more than a one-quarter rotation of the gear 10.

The arrangement of the gear 10 relative to the intake and exhaust ports is such that the slow moving period of the gear 10 takes place while both of said ports are closed and the piston is on its compression and power strokes, while the fast moving period of the gear 10 takes place while the piston is on its exhaust and intake strokes during which time the exhaust and intake ports are to be opened and closed. Through this arrangement very wide intake and exhaust ports are made possible and are rapidly uncovered and covered leaving ample uncovered periods for satisfying the full needs of the piston movements.

It will be further seen that the relation of the valve to the piston movements is such that the operation of opening both the intake and exhaust ports is effected very largely while the crank shaft is passing its high and low points, and thus while the piston is moving at its minimum speed. Also it will be observed that the operation of closing both the intake and exhaust ports takes place while the crank shaft is passing its high and low points. From a constantly rotating shaft, and through gears constantly in mesh, the valve is made to open the intake port quickly and close it slowly.

While in the views Figs. 5 to 8 only one valve H and gear 10 is shown in association with the gear 15, it will of course be understood that a second valve H and gear 10 might be placed at the left of the gear 15, as shown in the other figures. In such arrangement the gear 15 would operate with its longest axis alternately affecting one of the gears 10, and then the other. In this way the gears are all kept constantly in mesh while their centers remain unchanged and at the same time strains upon the gear 15 are balanced so that the power exerted for operating it is uniform. A certain smoothness of operation is thus attained which is very desirable.

The intake and exhaust ports 4 and 5 are of somewhat different widths circumferentially of the valve, the exhaust port being wider. By this means the relatively faster movement of the opening 8 in traversing the port 5, as compared with the relatively slower movement in passing the port 4, does not shut off the port 5 prematurely. The extended width of the port 5 enables said port to remain open for substantially the same duration of time as the port 4.

The valve arrangement as above described is particularly well adapted in use for high speed engines not only because it includes no reciprocating parts, but because of the fact that even though the engine may be running fast, yet the opening of the ports is always ample and the closing of the ports is delayed. Fuel is taken and exhaust gases discharged with the same efficiency as if the engine were running slower.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. In an internal combustion engine having an intake port and an exhaust port, a rotary valve for controlling said ports, said valve having an opening movable into and out of register with said ports, and means for producing a relatively rapid speed of rotation of the valve when the valve is moving to bring said opening into register with one of said ports and for producing a relatively decreased speed of rotation of the valve as it moves to close said mentioned port.

2. An internal combustion engine comprising a cylinder, a piston therein, a crank shaft operatively connected with the piston, and the cylinder having intake and exhaust ports, the combination therewith of a rotatable valve mounted to rotate for opening and closing said ports, and means whereby the initial movements of the piston on its intake stroke will produce a relatively rapid speed of rotation of the valve for fully uncovering the intake port and whereby the final movements of the piston on its intake stroke will produce a relatively decreased speed of rotation of the valve and thereby prolong the open period of the intake port.

3. An internal combustion engine having an intake port and an exhaust port, a rotary valve for controlling said ports, said valve having an opening movable into and out of register with said ports, one of said ports being circumferentially narrower than the other, and means for producing a relatively rapid speed of rotation of the valve when the valve is moving to bring its opening into register with each of said ports and for producing a relatively decreased speed of rotation of the valve as the valve opening moves to close the narrower port.

4. An internal combustion engine comprising in combination a cylinder, a piston therein, a crank shaft operatively connected with said piston, the said cylinder having intake and exhaust ports, a rotary valve cooperating with said ports, and means for driving said valve from said crank shaft at a constantly changing speed, said speed being greatly accelerated during the opening of the exhaust port, attaining its highest speed when this port is closed and the intake about to open and slowing down from this point until the intake is closed, said valve making one revolution during two revolutions of said crank shaft.

5. An internal combustion engine having an intake port and an exhaust port, of a rotatable valve and means for moving said valve into and out of registry with said exhaust port with a speed continuously accelerated to the end of the piston stroke, and into and out of registry with the intake port with a speed continuously retarded to the end of the piston stroke.

6. An internal combustion engine having a plurality of ports, a rotary valve for controlling said ports, said valve having an opening movable into and out of registry with said ports and means for rotating said valve with continuously accelerated speed to the end of the exhaust stroke and continuously retarded speed to the end of the intake stroke.

In testimony whereof I have signed this specification this 21st day of April, 1919.

HENRY M. SMYTH.